United States Patent
Nygard et al.

(12) 
(10) Patent No.: US 6,509,565 B2
(45) Date of Patent: Jan. 21, 2003

(54) DISCRIMINATOR CIRCUIT FOR A CHARGE DETECTOR

(75) Inventors: Einar Nygard, Vettre (NO); Tsutomu Yamakawa, Tochigi (JP)

(73) Assignees: Ideas ASA, Hovik (NO); Toshiba Corporation, Tokyo (JP)

(*) Notice: Subject to any disclaimer, the term of this patent is extended or adjusted under 35 U.S.C. 154(b) by 17 days.

(21) Appl. No.: 09/789,316

(22) Filed: Feb. 20, 2001

(65) Prior Publication Data

US 2002/0113211 A1 Aug. 22, 2002

(51) Int. Cl.$^7$ ................................................. G01T 1/16
(52) U.S. Cl. ........................ 250/336.1; 250/370.09; 250/370.11
(58) Field of Search ........................ 250/336.1, 370.09, 250/370.11; 327/50, 51, 77, 80, 170

(56) References Cited

U.S. PATENT DOCUMENTS 5,656,818 A    8/1997  Nygard ................. 250/370.09

6,201,417 B1 * 3/2001 Blum et al. .................... 327/14

FOREIGN PATENT DOCUMENTS

EP          0 893 705 A2    1/1999

* cited by examiner

*Primary Examiner*—Constantine Hannaher
*Assistant Examiner*—Timothy Moran
(74) *Attorney, Agent, or Firm*—Fitch, Even, Tabin, & Flannery

(57) ABSTRACT

A method and threshold discrimination circuit for threshold discriminating an accumulated charge signal in a charge readout sensor, wherein the accumulated charge signal is shaped with a filter prior to effecting threshold discrimination thereof, and a slew rate of the filter is limited so that the filtered accumulated charge signal reaches a predetermined threshold at a time that remains constant irrespective both of an amplitude of the signal and of charge collection time. Such a threshold discrimination circuit finds particular application in a charge readout sensor in a nuclear imaging system where very accurate determination of the time of photon emission is required.

19 Claims, 6 Drawing Sheets

Slow Shaper signal

Fast Shaper signal

Trigger

S/H

Fixed Delay:
$T_P$(slow shaper)

( PRIOR ART )

DISCRIMINATOR CIRCUIT FOR A CHARGE DETECTOR

FIELD OF THE INVENTION

This invention relates to a charge detector for reading charge produced by an active pixel in the detector.

BACKGROUND OF THE INVENTION

A known diagnostic technique used in tomography for locating tumors involves injecting into a patient's bloodstream a radioisotope which targets the tumor, so that the location of the tumor can be derived by detecting the location of the radioisotope. Typically, the radioisotope emits γ-rays which are dispersed from the tumor site. In order to achieve the desired detection so as to determine the precise location of the tumor, it is necessary to image the patient's body in such a manner as to detect only those γ-rays which are emitted normally from the body and to ignore those γ-rays which are dispersed in other directions.

U.S. Pat. No. 5,656,818 (Nygård) assigned to the one of present applicants discloses such a radiation imaging system that includes a detector unit and a receiver unit. The detector unit includes a two-dimensional sensor, first and second amplifier channels, first and second multiplicity generators and first and second address generators. The two-dimensional sensor includes first and second sensing elements that sense radiation in a first direction and a second direction, respectively. Each first amplifier channel generates an output signal based on a detection output from a corresponding one of the first sensing elements. The first multiplicity generator generates a first multiplicity signal representing a number of the first amplifier channels generating output signals. The first address generator generates a first analog address of a first amplifier channel associated with a received output signal. The second amplifier channels, second multiplicity generator and second address generator operate in like manner with respect to the second sensing elements. The receiver unit includes converters for converting the first and second analog addresses into first and second digital addresses. The receiver unit also includes a tester for testing whether the first and second digital addresses represent a valid position address in the first and second direction based on the first and second multiplicity signals.

Different types of computer tomography are known in which such a radiation imaging system may be embodied. In Single Photon Emission Computed Tomography (SPECT) more than one detector is rotated around the subject. During the rotation of the detector, the counting of the gamma rays is repeated. Then, the radioisotope's distribution (tomographic image) is reconstructed based on the obtained count values of the γ-rays.

In contrast to SPECT where a radioisotope in the body emits γ-rays produced by a single photon, in Positron Emission Tomography (PET) a patient is administered a radioisotope that emits positrons (i.e. positively charged electrons). When the positrons meet electrons within the body, the positrons and electrons mutually annihilate and produce two γ-rays that propagate away from each other at an angle of 180° and are detected by respective detector elements in the PET scanner. The scanner's readout electronics record the detected γ-rays and map an image of the area where the radioisotope is located. Here also two simultaneous detections are indicative of a positron emission from the tumor site.

Thus, in PET two simultaneous γ-rays must be detected on opposite sides of the patient's body. The positrons are extremely short lived and simultaneity implies that the two γ-rays can both be detected within a short time window, which is 10 ns, for example. The PET scanner surrounds the patient like a CT scanner and typically comprises in the order of 200,000 pixels on detector elements. Thus, it is necessary to detect two excited pixels within a short time difference and then to read out the energy of these two pixels. Only if the energy of each active pixel equals about 511 keV, (i.e. the energy of the incident γ-radiation) are the two photons the result of positron-electron annihilation and thus indicative of the tumor's location. Also in a PET scanner Compton scattering can occur within the detector, whereby a photon is only partially absorbed by the pixel and partially scattered to another pixel or occasionally to even more than a single pixel. In this case the sum of the energies of simultaneous active pixels will be equal to about 511 keV.

Additionally, there is another apparatus which is called Compton Camera. In the Compton Camera in order to determine the location of the γ-ray based on the detection of the single photon thus emitted, it is necessary that Compton scattering occur, so that another photon will be emitted substantially simultaneously, thereby allowing the angle of the incident γ-ray to be calculated.

Here, too, it is necessary to establish simultaneity of a γ-ray striking multiple pixels, although Compton Camera and PET must detect simultaneous γ-rays and so the time difference for establishing simultaneity of two or more pixels becoming active is more critical than SPECT.

In EP 893 705 published on Jan. 27, 1999 entitled "Multi-Channel Readinig Circuit for Particle Detector" and assigned to one of the present applicants, there is described a method for reading an array of pixels in a 2-dimensional image sensor so as to reduce the time taken to detect a single "active" pixel. The reading circuit described in EP 893 705 uses two detectors for detecting Compton scattering, requiring that data be read out in the first detector from a large number of addressable pixels along respective channels in order to detect which pixel is "active". This is done by first integrating the charge associated with each pixel using an integrator in the form of an operational transconductance amplifier having a feedback capacitor. The integrated charge pulse is then amplified and shaped and the resulting analog signal is sampled and held, allowing its magnitude to be measured. In order to measure the peak magnitude of the shaped signal, the shaped signal must be very accurately sampled at the peak value. This requires an accurate determination of the peak time $T_P$ that occurs a fixed time difference $T_P$ after the emission of charge by the excited pixel. The fixed time difference $T_P$ is a function of the RC time constant of the shaper circuit and is therefore known.

Thus, in order to know when to sample the integrated charge signal, the time of occurrence of each charge emission must itself be accurately determined. In EP 893 705, this is done by using a fast shaper having a very fast time constant to determine the peak time of the signal, being the time taken for it to cross a threshold value as measured by a threshold discriminator. This having been done, all that is then necessary is to sample the held integrated charge sample after a time difference $T_P$. A reading system for reading out the charge signals must therefore generate an accurate trigger simultaneous with the occurrence of each charge emission.

It is apparent that the accuracy with which the time of occurrence to of each charge emission is determined is a function of the accuracy with which the event can be discriminated. In practice, the threshold discrimination is susceptible to various types of error, as will now be explained, which can affect the accuracy with which the trigger event can be discriminated. As noted above, this may not be quite so critical in SPECT-type scanners but that can indeed be critical in PET-type scanners and in the Compton Camera where simultaneity of two events must be determined.

FIG. 1 shows a partial detail of a prior art reading PET-type nuclear imaging system 10. The nuclear imaging system comprises a detector 11 (constituting a charge readout sensor) that surrounds a patient (not shown) and is shown only partially in the figure and comprises multiple detector segments 12. Each detector segment 12 is shown as having an array of 512 pixels 13 constituted by scintillators and photomultiplier tubes that are responsive to an incident γ-ray for producing a charge signal, two pixels are irradiated simultaneously by separate γ-rays owing to positron-electron annihilation, then a reading circuit 14 coupled to the detector segments 12 is capable of capturing such irradiations within a time frame of 10 ns. Coupled to the reading circuit 14 is a construction unit 15 for constructing an image based on output signals of the reading circuit 14.

In the multi-detector system described in EP 893 705, association between simultaneous events in different detectors is performed ex post facto by analysis of a corresponding time stamp and energy associated with each event. However, regardless of which type of nuclear imaging system is employed, simultaneity of two trigger events is determined in firmware using logic gates whose inputs derive firm corresponding pixels in the detector or in a segment thereof, and are set to logic HIGH when the pixel using logic gates whose inputs derive from corresponding pixels in the detector or in a segment thereof, and are set to logic HIGH when the pixel goes active, as determined by the level of its accumulated charge signal reaching a predetermined threshold.

FIG. 2 shows a detail of the reading circuit 14 including a respective preamplifier 15 coupled to each pixel 13 and having an output connected via respective capacitors 16 and 17 to a fast shaper 18 and a slow shaper 19 having respective high and low RC time constants. The output of the slow shaper 19 is the accumulated charge signal of the respective pixel and is sampled and held by a sample and hold circuit 20. An output of each of the fast shapers 18 is fed to a respective threshold discriminator 21 for determining whether the respective pixel is active and for allowing simultaneity of active pixels in different detector segments 12 to be established.

The output of each threshold discriminator 21 is fed to a corresponding mono-stable latch 22 whose output latches to logic HIGH if the corresponding pixel is active. The outputs of all the mono-stable latches 22 in each detector segment are wired OR-ed so as to form a composite output (Trigger Out) that is HIGH if any one of the pixels in that detector segment is active and is LOW otherwise. The output of every mono-stable latch 22 in each detector segment is AND-ed with the respective composite output of every other detector segment. Consequently, the AND-ed output is HIGH only if the corresponding pixel in the detector segment is active at the same time as an active pixel in a complementary detector segment. By such means, simultaneity of charge emissions emanating from two detectors segments may be established in real time.

The threshold discriminator 21 establishes when a pixel goes "active" by comparing the fast-shaped signal with a predetermined threshold. An "active" pixel is determined as one for which the integrated charge signal exceeds the threshold voltage. The time at which this occurs hold circuit 20. The time origin also establishes simultaneity of γ-rays striking multiple pixels.

A processing unit 23 is coupled to the respective sample and hold circuits 20 associated with each pixel 13 for computing a cumulative energy value associated with pairs of active pixels in the charge readout sensor so as to determine whether the emission is indicative of Compton scattering. This allows determination of the pixel actually hit by the γ-ray since this pixel usually absorbs the least amount of energy, the remainder component having a larger amount of energy being scattered. In a PET-scanner, the processing unit 23 is thus able to determine whether, corresponding to such a pixel, there exists an active pixel on the opposite side of the detector whose energy value is about 511 keV or which was itself directly hit by a γ-ray that was then Compton scattered. By such means, the processing unit 23 identifies the pair of active pixels as having been hit by a pair of γ-rays produced by a single positron-electron annihilation. The processing unit 23 in combination with the respective sample and hold circuits 20 constitutes a simultaneity detector for detecting simultaneity of two outputs among the detector segments. Operation of the processing unit 23 is not itself a feature of the present invention.

FIG. 3a shows graphically a signal waveform 30 corresponding to the integrated charge signal stored in the sample and hold circuit 20 and used to measure the peak energy level of the associated pixel. As explained above, this is done by measuring the value of the signal waveform 30 a time difference $T_P$ after the fast shaper signal 31 shown in FIG. 3b crosses the threshold 32. This generates a Trigger pulse 33 shown in FIG. 3c establishing a time origin $T_O$. FIG. 3d shows a Timing pulse 34 produced a time difference $T_P$ after the Trigger pulse 33 for measuring the peak value of the slow shaper signal 30.

The time origin $T_O$ established by the fast shaper signal crossing the threshold 32 is, in fact, only an approximation of the time that a photon strikes an "active" pixel since it takes time, albeit very little, for the fast shaper signal 31 to cross the discrimination threshold 32. In fact, from a knowledge of the RC time constant of the fast shaper 18 and a knowledge of the level of the discrimination threshold 32, the time taken to cross the threshold 32 can be calculated and the time difference $T_P$ compensated for accordingly. Moreover, in practice, any slight error in determining the time origin $T_O$ of a photon striking an "active" pixel has little bearing on the accuracy with which the energy associated with that pixel is determined. This is because, the integrated charge signal stored in the sample and hold circuit 20 is shaped by the slow shaper 18 having a slow RC time constant and is relatively well spread out at the peak. Thus, a very small difference either side of the peak has negligible effect on the measured peak value.

However, any slight error in determining the time origin $T_O$ of a photon striking an "active" pixel does indeed have a critical bearing on the ability to determine whether two photons are simultaneous. There are two theories of the cause of error made in determining the time origin $T_O$. One theory can be seen from FIG. 3e showing a pair of fast shaper signals 35 and 36 both emanating from a common absolute time origin O but having slightly different time derivatives and peak voltages. This is typically due to Compton scattering whereby an initial photon is partially absorbed by a first pixel, giving rise to the first signal 35, and partially scattered to another pixel giving rise to the second signal 36. In this case the sum of the energies of simultaneous active pixels is equal to 511 keV. As a result, the signal 35 crosses the threshold 32 at a time $T_{35}$, which is somewhat before the time $T_{36}$ when the signal 36 crosses the threshold 32 giving rise, in effect, to different time origins. The difference between the time $T_{35}$ and the time $T_{36}$ may well exceed 10 ns. In such case, the two signals 35 and 36 would be rejected as simultaneous even though, in fact, they are thus losing valuable data.

The other theory can be seen from FIG. 3*f* showing graphically the situation where the two signals 35 and 36 both emanate from a common absolute time origin 0 having slightly different time derivatives albeit identical peak energies. This is due to the so-called "bulk theory", described below with reference to FIG. 4.

The difference in time taken for signals having a common time origin to pass the threshold is known as "time walk" and must be compensated for or eliminated in order to sample each of the signals at the correct time so as to obtain the respective peak value. Use of the fast and slow shapers as described in EP 893 705 is generally sufficient to compensate for the delay between the time at which each curve passes through the threshold and the time at which the curve reaches its peak value thus allowing the peak values of different signals to be sampled at the correct times. However, use of the fast and slow shapers does not sufficiently reduce the effect of time walk to determine simultaneity of photon emissions with high accuracy. This may be of particular relevance to PET type nuclear imaging systems where two photons are produced almost instantaneously and should preferably be detected within a time window of less than 10 ns to be established as a PET emission.

What is stated above is true generally for electronic pulse circuits, but is particularly relevant for charge detectors where very accurate timing is required, for reasons that will now be explained. FIG. 4 shows schematically an equivalent circuit of a pixel having a semiconductor or scintillator bulk 40, for example silicon or CdTe as semiconductor or BGO as scintillator, one end of which is biased at a voltage of −10V using silicon or −1000V using CdTe and the other end of which is connected to an anode of a rectifier diode 41. When a γ-ray strikes the bulk, it releases an electron 42 from the bulk. The released electron 42 moves towards the anode of the rectifier diode 41, while the resulting positively charged hole 43 propagates towards the negatively charged end of the bulk. The total charge indicated by the maximum charge current that is created owing to a γ-ray striking the bulk is independent of where in the bulk the γ-ray strikes. However, the rate of change of charge current is a function of how fast the released electron reaches the diode 41 and this will be shorter for a γ-ray that strikes the bulk close to the diode 41 than for one that strikes remote therefrom. This difference in the rate of change of charge current is said to derive from "charge collection time" and is seen as a difference in the rate at which the charge current reaches its maximum level. Specifically, it gives rise to time walk whereby the time taken for the charge current to reach the threshold varies according to the rate at which the charge current crosses the threshold.

Thus reverting to FIG. 3*f*, a γ-ray that strikes the bulk close to the diode 41 would give rise to the signal 35, while the same γ-ray striking the bulk remote from the diode 41 would give rise to the signal 36. The time origin $T_O$ for these signals thus varies according to where in the bulk the γ-ray strikes the pixel. As noted above, the absolute times of photon emission are not known and are not important in this context since simultaneity between two emissions is determined by the measured time at which the respective signals reach the threshold. It is therefore important that the delay between the actual time of occurrence and the detection time be independent of the characteristics of the integrated charge signal.

Time walk may also arise from differences in the peak value $V_P$ of the signal, which affects the rate at which the integrated charge signal reaches the peak owing to the frequency characteristics of the fast shaper.

Thus, there is a need to reduce time walk in a photon detector so that the time taken for a signal to reach the threshold of the threshold discriminator is substantially independent of the peak signal magnitude or of where the photon that gave rise to the charge signal struck the detector.

SUMMARY OF THE INVENTION

It is therefore an object of the invention to provide an improved discriminator circuit for use with a photon detector having reduced time walk.

This object is realized in accordance with a broad aspect of the invention by a method for threshold discriminating an accumulated charge signal in a charge readout sensor, the method comprising the steps of:

(a) shaping the accumulated charge signal with a filter prior to effecting threshold discrimination thereof, and (b) limiting a slew rate of the filter so that the filtered accumulated charge signal reaches a predetermined threshold at a time that remains constant irrespective both of an amplitude of said signal and of charge collection time.

According to a second aspect of the invention, there is provided a charge readout sensor for threshold discriminating an accumulated charge signal, the charge readout sensor comprising:

a filter having a fast time constant for shaping the accumulated charge signal, a threshold discriminator coupled to an output of the filter for effecting threshold discrimination thereof and determining an initiation time $T_O$ of the accumulated charge signal, and a slew rate limiter coupled to an output of the threshold discriminator for limiting a slew rate of the filter so that the filtered accumulated charge signal reaches a predetermined threshold at a time that remains constant irrespective both of an amplitude of said signal and of charge collection time.

Such a charge readout sensor may be used within an improved discriminator circuit including a fast shaper as shown in FIG. 2, which shapes the integrated charge signal so as to generate a fast response curve that quickly rises above a predetermined threshold. The fast shaper includes an amplifier whose slew rate may thus be limited so that the integrated charge signal crosses the threshold a fixed delay after actual occurrence of the trigger event.

According to a particular application of such an improved discriminator circuit, there is provided a charge readout sensor for determining time of emission of an accumulated charge signal emitted by an active pixel in a charge readout sensor having a plurality of pixels, the charge readout sensor comprising:

a fast shaper having a fast time constant for shaping the accumulated charge signal so as to generate a fast response curve which quickly rises above a predetermined threshold, a threshold discriminator coupled to an output of the fast shaper for effecting threshold discrimination thereof and determining an initiation time $T_O$ of the accumulated charge signal, and a slew rate limiter coupled to an output of the threshold discriminator for limiting a slew rate of the fast shaper so that the filtered accumulated charge signal reaches a predetermined threshold at a time that remains constant irrespective both of an amplitude of said signal and of charge collection time.

BRIEF DESCRIPTION OF THE DRAWINGS

In order to understand the invention and see how the same may be carried out in practice, a preferred embodiment will now be described, by way of non-limiting example only, with reference to the accompanying drawings, in which.

DETAILED DESCRIPTION OF THE INVENTION

Figure 5:
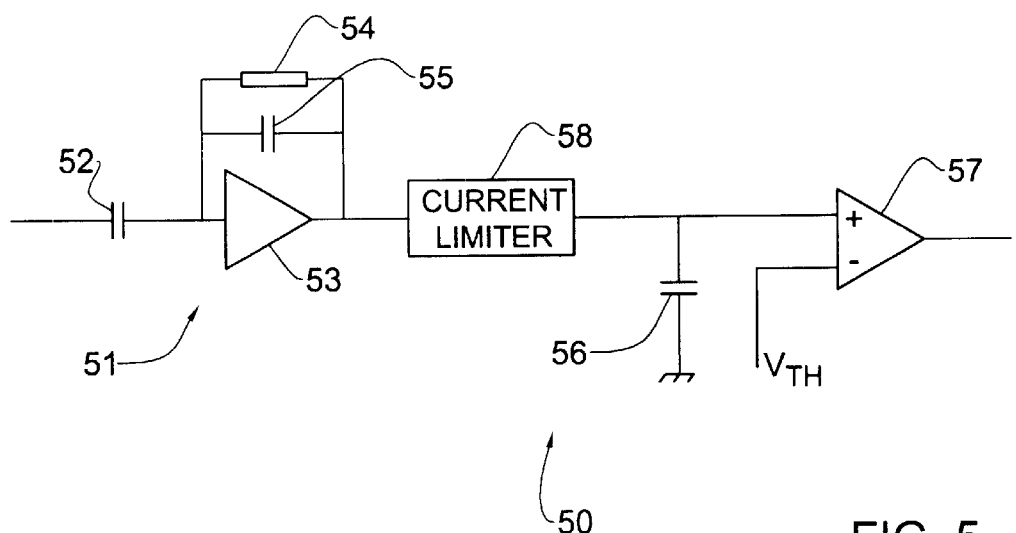
FIG. 5 is a schematic diagram showing a timing detector according to the invention including a modified fast shaper for shaping the integrated charge signal.

FIG. 5 shows a detail of a timing detector 50 comprising a fast shaper 51 having an input capacitor 52 for coupling to an amplified integrated charge signal. The fast shaper 51 includes an operational transconductance amplifier 53 having a fast RC time constant determined by a feedback resistor 54 and a feedback capacitor 55. The fast shaper 51 also includes an output capacitor 56 for accumulating voltage and which is connected to a threshold discriminator 57 for comparing the accumulated voltage across the output capacitor 56 with a fixed threshold, $V_{TH}$. Connected between the output of the amplifier 53 and the output capacitor 56 is a current limiter 58, which limits the current that can flow into the output capacitor 56 and thus the rate at which it saturates. In practice the current limiter 58 is realized by limiting the bias current of the output transistors within the amplifier so that they cannot sink current greater than a specified, reduced value. Clearly, this may be done by modifying the external bias resistors so that, for a MOSFET, the depletion layer is pinched thus allowing less current to pass therethrough.

Figure 6:
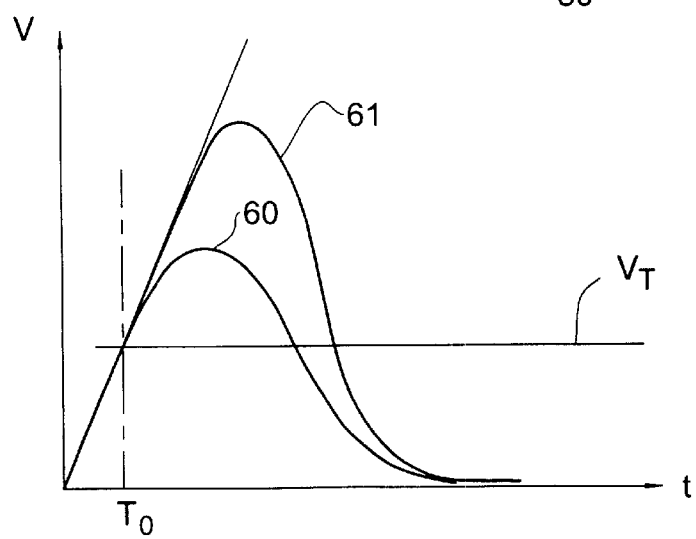
FIG. 6 shows graphically the effect of reduced time walk between a pair of signals discriminated by the timing detector shown in FIG. 5.

FIG. 6 shows graphically curves 60 and 61 representing charge current against time for two charge signals having different peak amplitudes. It is seen that both curves 60 and 61 are constrained to rise with the same slew rate, so that they reach the threshold $V_T$ is substantially at the same $T_O$. Therefore, the times at which the respective photon emissions are detected is independent of the peak amplitude of the integrated charge as well as where in the bulk the photon struck in order to trigger the event.

Figure 2:
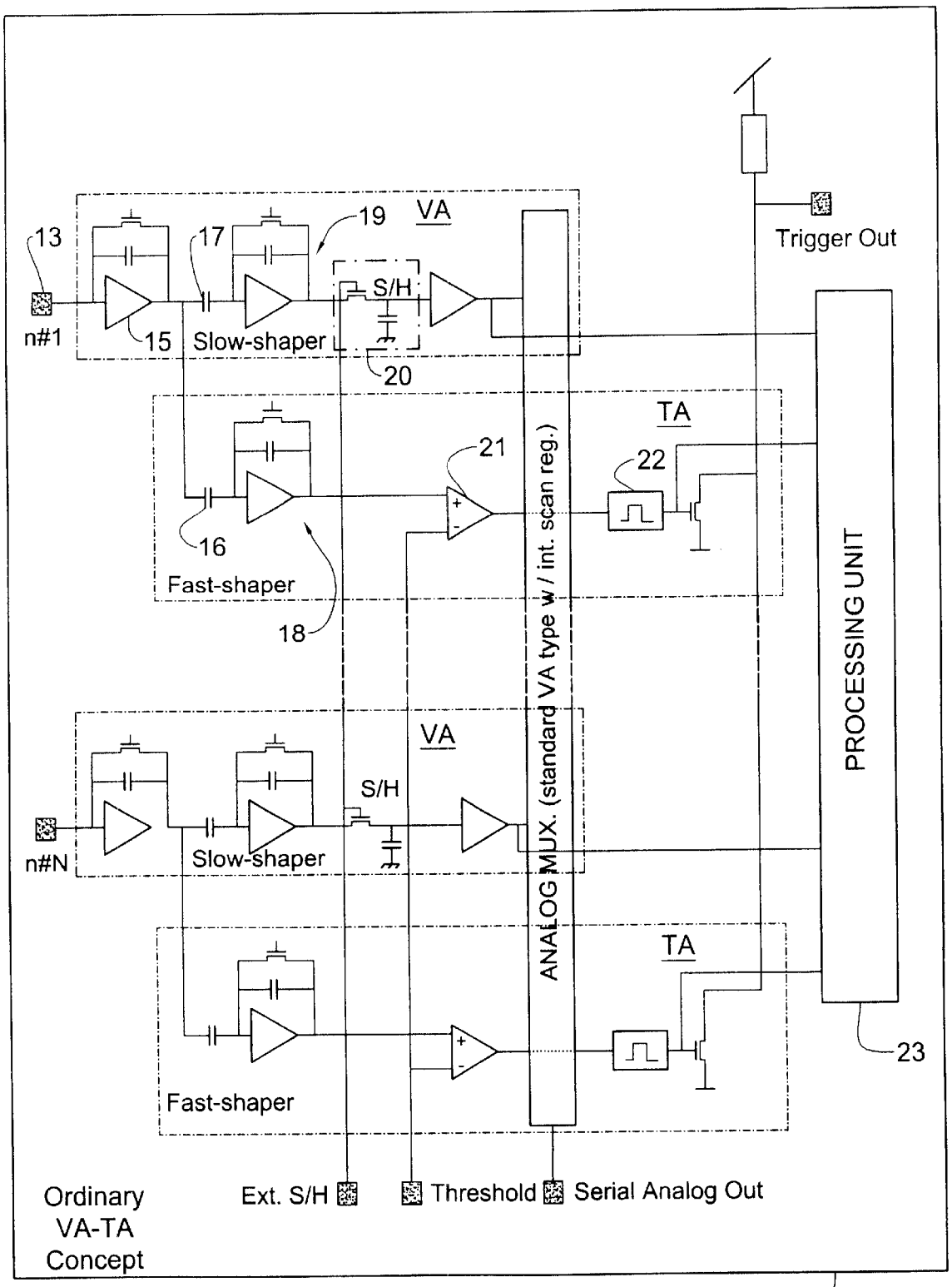
FIG. 2 is a schematic diagram showing a partial detail of the prior art reading circuit used in the nuclear imaging system of FIG. 1.
Figure 3A:
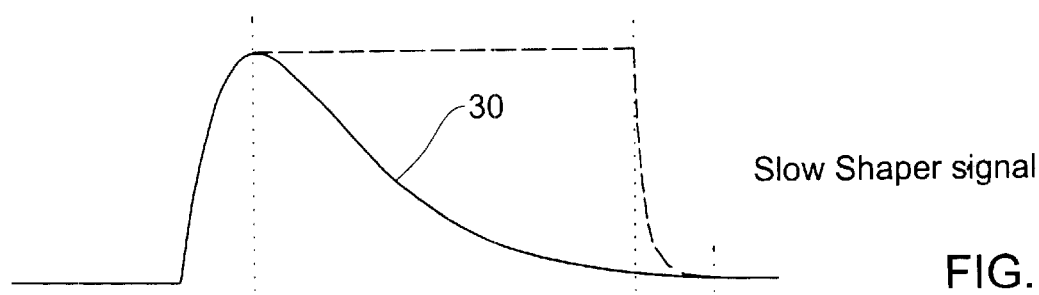
FIGS. 3a to 3d show graphically timing waveforms associated with fast and slow shapers used in the reading circuit of FIG. 2.
Figure 3B:
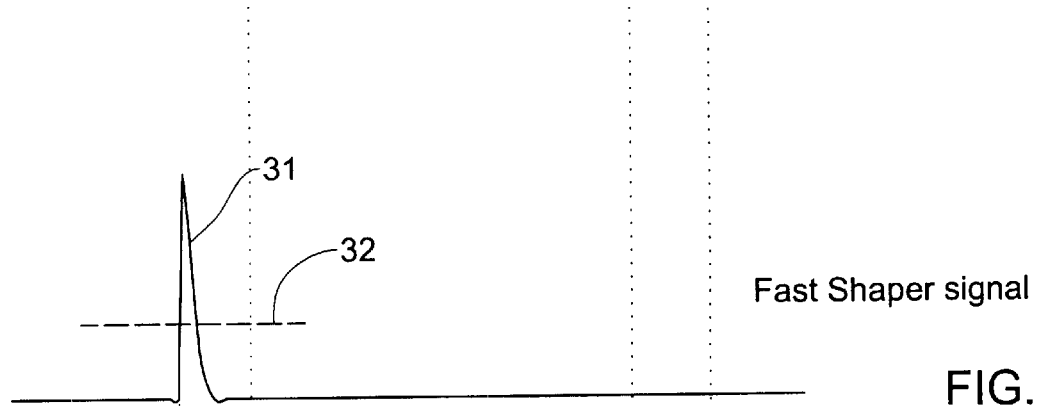
Figure 3C:
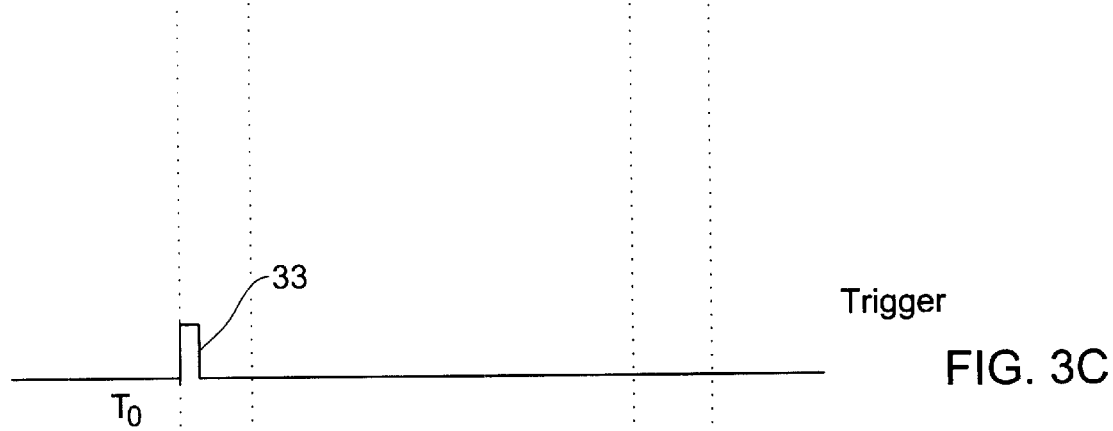
Figure 3D:
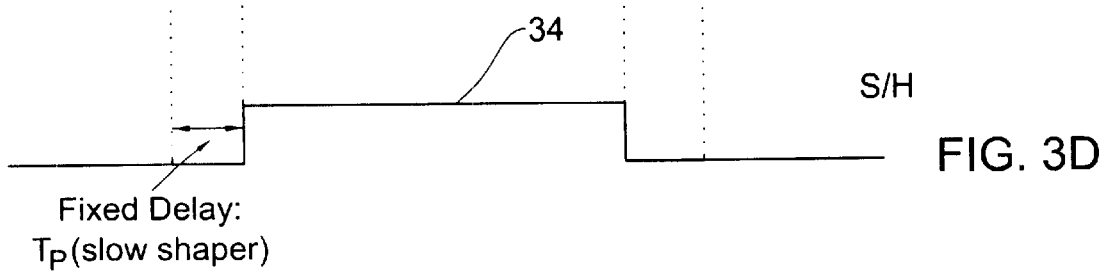
Figure 3E:
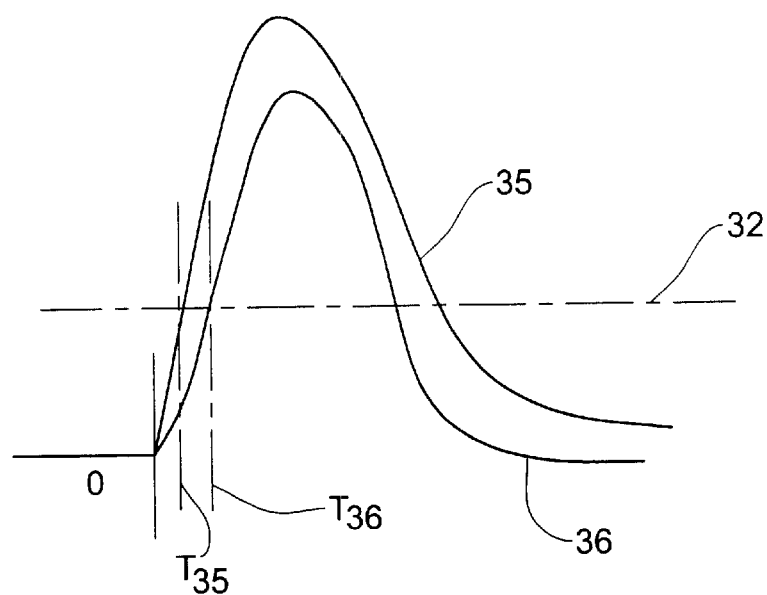
FIGS. 3e and 3f show graphically the effect of time walk in an integrated charge signal according to the "different energy" and "bulk" theories, respectively.
Figure 3F:
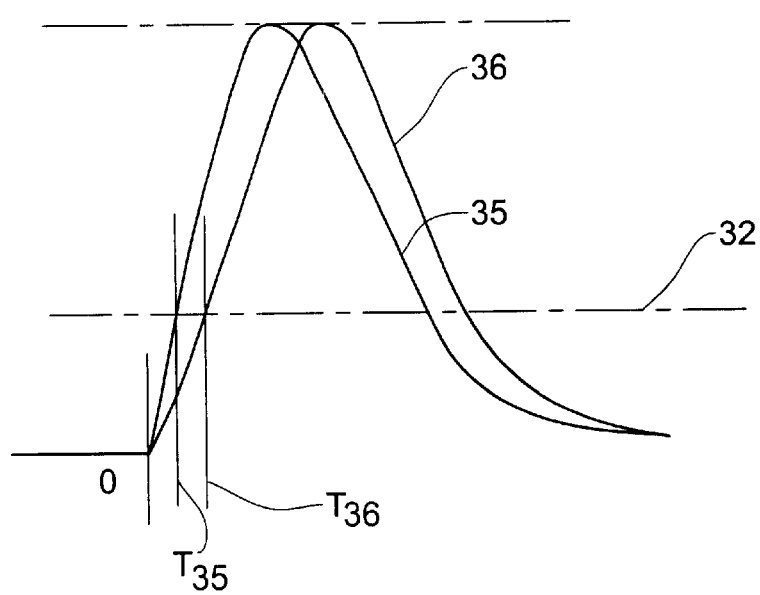
Figure 4:
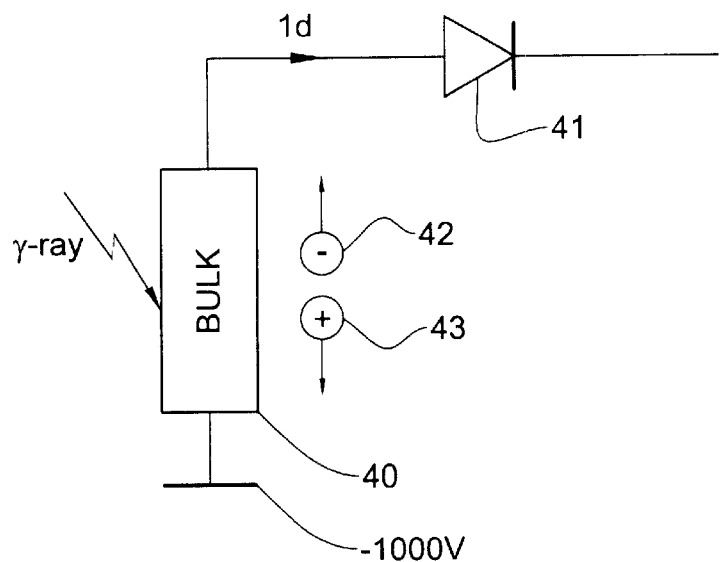
FIG. 4 shows schematically a pixel in a charge detector useful for explaining the origin of "time walk" associated with a signal detected thereby.
Figure 7:
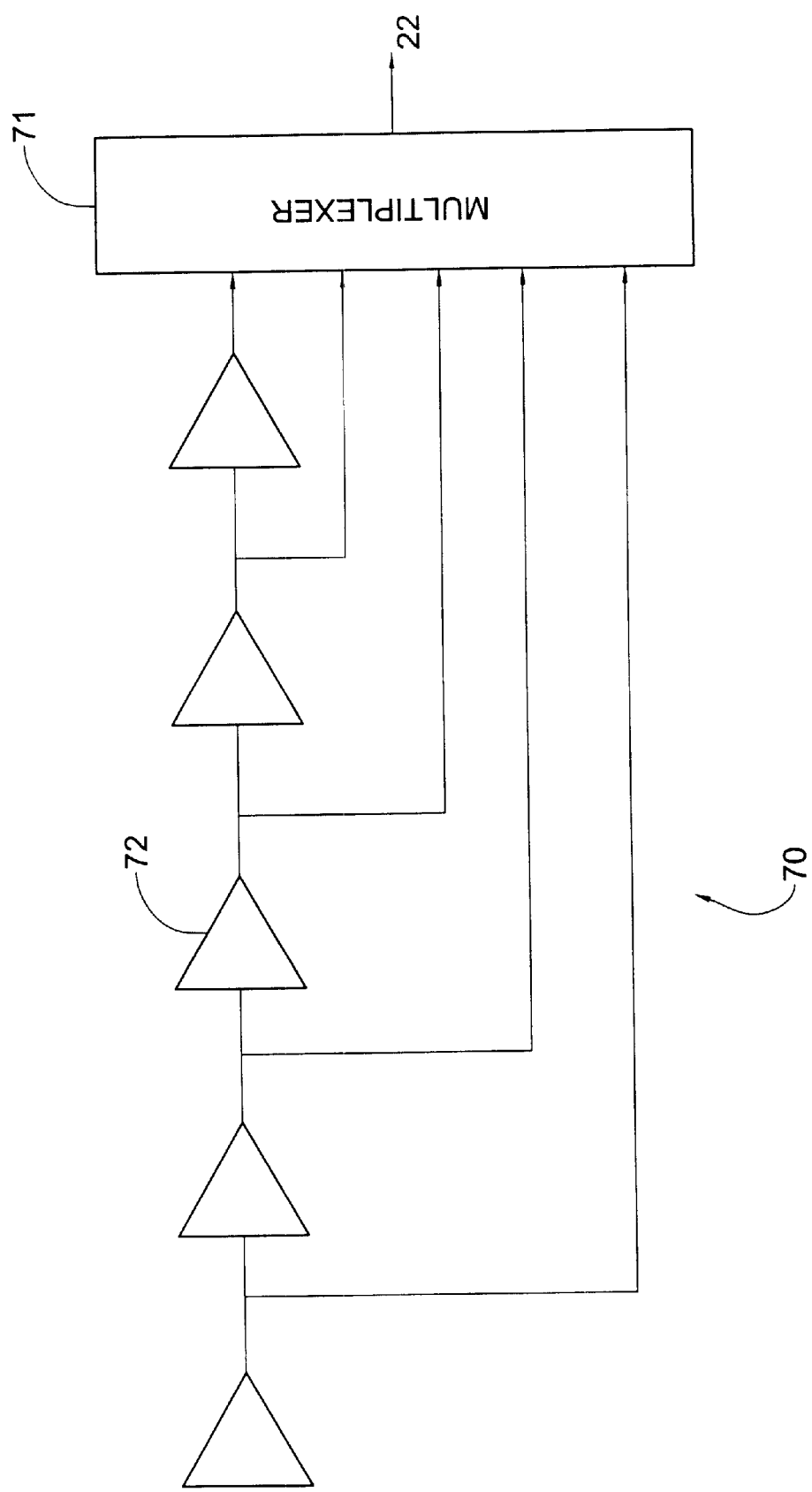
FIG. 7 shows schematically a calibration circuit for compensating for delays in the threshold discriminator shown in FIG. 2.

FIG. 7 shows schematically a calibration circuit 70 that may be connected between each threshold discriminator 57 and the corresponding monostable 22 (shown in FIG. 2) for fine adjustment of propagation delays in the threshold discriminator, which is apt to vary from channel to channel owing to process parameter variation. It will be understood that all of the threshold discriminators must be subject to identical delays, since otherwise they will reach their respective peak values at different times notwithstanding that their respective signals are initiated at identical time origins. This, of course, must be avoided since otherwise the whole object in avoiding, or compensating for, time-walk is rendered moot.

The calibration circuit 70 comprises a series of delay circuits 72 connected in cascade and each coupled to a respective input of a multi-pole switch 71 having a single output connected to the monostable 22. In use, a corresponding calibration circuit 70 is connected to the output of the respective threshold discriminator 57 connected to each pixel 13 in the detector 12 and a signal is applied to each of the pixels simultaneously. This should give rise to each of the monstables 22 producing a signal simultaneously. However, in practice, this is not the case owing to the different delays of the threshold discriminators 57, as explained above. Therefore, the threshold discriminators 57 are calibrated by adjusting the switch 71, whereby different numbers of delay circuits 72 are successively serially connected between the threshold discriminator 57 and the monostable 22, thus changing the effective overall delay. This is done for different settings of the switch 71, until each of the monostables 22 produces an output at the same time. The respective switches 71 are then left intact or, if desired, they may be removed and the requisite number of delay circuits 71 may be hard-wired between the between the respective threshold discriminator 57 and the corresponding monostable 22.

It will be appreciated that modifications may be effected to the particular embodiments as described without departing from the scope of the invention as claimed. Thus, for example, whilst the invention has been described with particular regard to the detection of γ-ray emissions, it is to be understood that the same principles are equally well applicable for the detection of other high-energy particles. As will also be appreciated, such high-energy particles may be photons or charged particles. Likewise, although the use of the multi-pixel sensors within a Compton camera or PET scanner has been described, it is to be understood that the same principles are equally well suited for use with a hybrid photon detector and for readout of photomultiplier tubes.

It should also be pointed out that when the sensor modules are based on silicon, each pixel is effectively a diode. However, other semiconductor sensors may also be employed in which case the pixels are high resistive elements. In either case, the rate at which charge reaches the sensor may vary depending on where in the bulk of the sensor the event is triggered.

It will also be appreciated that the invention encompasses a nuclear medicine apparatus including a charge readout sensor as described above with reference to FIGS. 1 to 7 of the drawings. Such a nuclear medicine apparatus includes a plurality of pixels for changing γ-rays to charge signals, and a plurality of first filters each coupled to a respective pixel and having a first time constant for shaping the charge signals. A respective slew rate limiter is coupled to each of the first filters for limiting slew rate of respective output signals of the first filters, and a respective threshold discriminator is coupled to each of the slew rate limiters for effecting threshold discrimination of output signals of the slew rate limiters. A respective second filter having a slower time constant than the first time constant is coupled to each pixel for shaping the charge signals, and a constructing unit is coupled to an output of the charge readout sensor as shown in FIG. 1 for constructing an image based on output signals of the threshold discriminators and the second filters.

Figure 1:
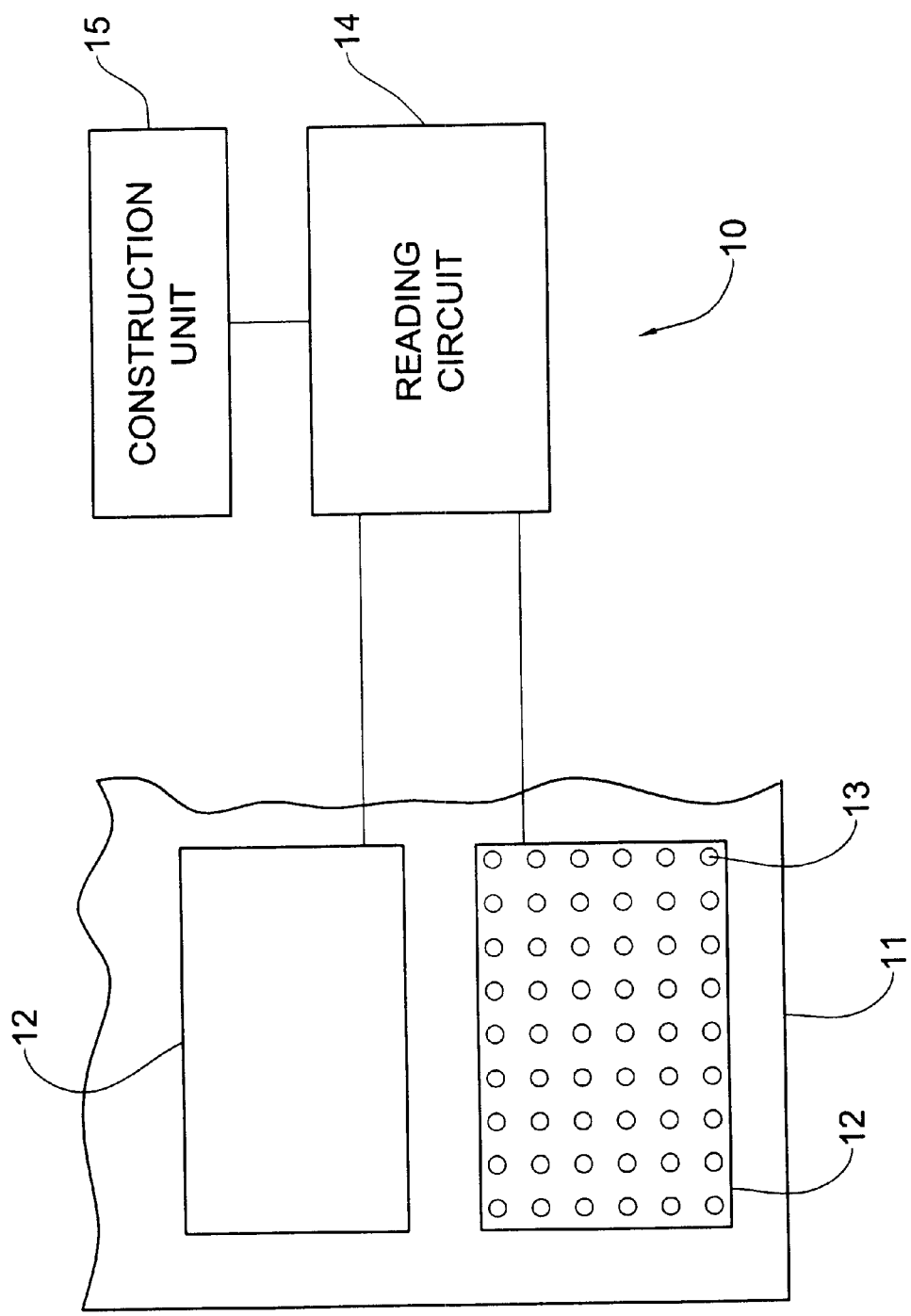
FIG. 1 is a schematic diagram showing a partial detail of a prior art nuclear imaging system including a reading circuit.

It will be appreciated that such a nuclear medicine apparatus can be PET system having multiple detector segments as shown schematically in FIG. 1 but it can equally well be a SPECT system or a Compton camera.

What is claimed is:

1. A method for threshold discriminating an accumulated charge signal in a charge readout sensor, the method comprising the steps of:
   (a) shaping the accumulated charge signal with a filter prior to effecting threshold discrimination thereof, and
   (b) limiting a slew rate of the filter so that the filtered accumulated charge signal reaches a predetermined threshold at a time that remains constant irrespective both of an amplitude of said signal and of charge collection time.

2. The method according to claim 1, wherein the filter includes an amplifier and step (b) includes limiting an output current of the amplifier so as to limit a rate at which charge is collected at an output thereof.

3. The method according to claim 2, wherein said step of limiting the output current of the amplifier includes limiting the current available in an output of the amplifier for limiting a maximum sink and/or source current thereof.

4. A method for determining time of emission of an accumulated charge signal emitted by an active pixel in a sensor having a plurality of addressable pixels, the method comprising the steps of:
   (a) feeding the charge signal to a fast shaper having a fast time constant for shaping the accumulated charge signal so as to generate a fast response curve which quickly rises above a predetermined threshold, and
   (b) limiting a slew rate of the fast shaper so that an output thereof reaches a predetermined threshold at an initiation time $T_O$ that remains constant irrespective both of an amplitude of the data signal and of charge collection time.

5. The method according to claim 4, further including the step of:
   (c) measuring a magnitude of the accumulated charge signal at a predetermined time interval $T_P$ after said initiation time $T_O$ so as to read the magnitude of the data signal.

6. The method according to claim 5, wherein step (c) includes the steps of:
   i) simultaneously feeding the accumulated charge signal to a slow shaper having a slow time constant so as to generate a slow response curve having high signal to noise ratio, and
   ii) sampling the slow response curve at a time $T_P$ after the initiation time $T_O$ where $T_P$ is a predetermined time interval calculated to coincide with the time at which the slow response curve reaches its peak value so as to determine an energy level associated with the active pixel.

7. The method according to claim 6, further including:
   (d) computing a cumulative energy value associated with pairs of active pixels in the charge readout sensor so as to determine whether the emission is indicative of Compton scattering.

8. A charge readout sensor for threshold discriminating an accumulated charge signal, the charge readout sensor comprising:
   a filter having a fast time constant for shaping the accumulated charge signal,
   a threshold discriminator coupled to an output of the filter for effecting threshold discrimination thereof and determining an initiation time $T_O$ of the accumulated charge signal, and
   a slew rate limiter coupled to an output of the threshold discriminator for limiting a slew rate of the filter so that the filtered accumulated charge signal reaches a predetermined threshold at a time that remains constant irrespective both of an amplitude of said signal and of charge collection time.

9. The charge readout sensor according to claim 8, wherein the filter includes an amplifier and the slew rate limiter is adapted to limit an output current of the amplifier so as to limit a rate at which charge is collected at an output thereof.

10. The charge readout sensor according to claim 9, including a current limiter for limiting the current available in an output of the amplifier for limiting a maximum sink and/or source current thereof.

11. A charge readout sensor for determining time of emission of an accumulated charge signal emitted by an active pixel in a charge readout sensor having a plurality of pixels, the charge readout sensor comprising for each of said pixels:
   a fast shaper having a fast time constant for shaping the accumulated charge signal so as to generate a fast response curve which quickly rises above a predetermined threshold,
   a threshold discriminator coupled to an output of the fast shaper for effecting threshold discrimination thereof and determining an initiation time $T_O$ of the accumulated charge signal, and
   a slew rate limiter coupled to an output of the threshold discriminator for limiting a slew rate of the fast shaper so that the filtered accumulated charge signal reaches a predetermined threshold at a time that remains constant irrespective both of an amplitude of said signal and of charge collection time.

12. The charge readout sensor according to claim 11, further including:
   a timing circuit for generating a clock signal a predetermined time interval $T_P$ after the initiation time $T_O$ such that the clock signal coincides with a peak of the accumulated charge signal.

13. The charge readout sensor according to claim 12, wherein the timing circuit includes:
   a slow shaper having a slow time constant for filtering the accumulated charge signal so as to generate a slow response curve having high signal to noise ratio, and
   a sampling circuit for sampling the slow response curve at a time $T_P$ after the initiation time $T_O$ so as to determine an energy level associated with the active pixel.

14. The charge readout sensor according to claim 13, further including:
   a processing unit coupled to the sampling circuit for computing a cumulative energy value associated with pairs of active pixels in the charge readout sensor so as to determine whether the emission is indicative of Compton scattering.

15. The charge readout sensor according to claim 13, further including:
 a processing unit coupled to the sampling circuit for computing an energy value associated with pairs of active pixels in the charge readout sensor so as to determine whether the emission is indicative of positron-electron annihilation.

16. The charge readout sensor according to claim 11, further including:
 a respective calibration circuit connected to an output of each threshold discriminator for fine adjustment of varying propagation delays in the threshold discriminators owing to process parameter variation.

17. The charge readout sensor according to claim 16, wherein each calibration circuit includes:
 a series of delay circuits connected in cascade and each having a respective output coupled to a respective input of a multi-pole switch having an output that is fed to the respective slew rate limiter.

18. A method for calibrating the calibration circuit of claim 17, said method comprising:
 (a) simultaneously applying a signal to each of the pixels in the readout sensor,
 (b) adjusting the multi-pole switch in each of the calibration circuits whereby different numbers of delay circuits are successively serially connected to the output of the threshold discriminator thus changing the effective overall delay, and
 (c) repeating step (b) as required until each of the multi-pole switches produces an output at the same time.

19. The method according to claim 18, further including:
 (d) removing the respective switches, and
 (e) hard-wiring a requisite number of delay circuits between the respective threshold discriminator and the respective slew rate limiter.

* * * * *